(12) United States Patent
Napier et al.

(10) Patent No.: US 12,465,206 B2
(45) Date of Patent: Nov. 11, 2025

(54) LARYNGOSCOPE AND METHODS OF USE

(71) Applicant: Bear Creek Medical LLC, Odessa, FL (US)

(72) Inventors: Andrew B. Napier, Odessa, FL (US); Robert D. Warden, III, Odessa, FL (US); Derek Herrera, Odessa, FL (US)

(73) Assignee: Intublade Co., Odessa, FL (US)

(*) Notice: Subject to any disclaimer, the term of this patent is extended or adjusted under 35 U.S.C. 154(b) by 149 days.

(21) Appl. No.: 17/547,726

(22) Filed: Dec. 10, 2021

(65) Prior Publication Data

US 2023/0181022 A1  Jun. 15, 2023

(51) Int. Cl.
| | |
|---|---|
| A61B 1/267 | (2006.01) |
| A61B 1/00 | (2006.01) |
| A61B 1/015 | (2006.01) |
| A61B 1/05 | (2006.01) |
| A61B 1/06 | (2006.01) |
| A61B 1/12 | (2006.01) |

(52) U.S. Cl.
CPC .......... *A61B 1/267* (2013.01); *A61B 1/00009* (2013.01); *A61B 1/00066* (2013.01); *A61B 1/00091* (2013.01); *A61B 1/015* (2013.01); *A61B 1/05* (2013.01); *A61B 1/0676* (2013.01); *A61B 1/0684* (2013.01); *A61B 1/128* (2013.01)

(58) Field of Classification Search
CPC .. A61B 1/267; A61B 1/05; A61B 1/00; A61B 1/126; A61M 5/178
See application file for complete search history.

(56) References Cited

U.S. PATENT DOCUMENTS

| | | | | |
|---|---|---|---|---|
| 5,571,071 | A * | 11/1996 | Shapiro | A61B 1/267 600/187 |
| 11,559,646 | B1 * | 1/2023 | Osman | A61B 1/01 |
| 2001/0032646 | A1 * | 10/2001 | Christopher | A61B 1/267 128/200.26 |
| 2011/0028790 | A1 * | 2/2011 | Farr | A61B 1/0676 600/187 |
| 2012/0149980 | A1 * | 6/2012 | Pacey | A61B 1/267 600/109 |
| 2018/0185591 | A1 * | 7/2018 | Cha | A61B 1/00087 |
| 2020/0288960 | A1 * | 9/2020 | Napier | A61B 1/0684 |
| 2020/0359883 | A1 * | 11/2020 | Livnat | A61B 1/0014 |
| 2020/0375448 | A1 * | 12/2020 | Hartley | A61B 6/541 |

FOREIGN PATENT DOCUMENTS

WO  WO-2009035646 A1 *  3/2009  .......... A61M 11/00

* cited by examiner

Primary Examiner — Eduardo C Robert
Assistant Examiner — Holly Joanna Lane
(74) Attorney, Agent, or Firm — SLEMAN & LUND LLP

(57) ABSTRACT

A laryngoscope includes a handle having an inner cavity configured to accept at least part of a syringe, the handle having (a) a syringe seat disposed at a bottom of the inner cavity, (b) a valve disposed below the inner cavity, and (c) a blade coupled to the handle, wherein the blade includes a housing connected to a camera having a lens.

18 Claims, 10 Drawing Sheets

LARYNGOSCOPE AND METHODS OF USE

FIELD

The present disclosure relates to a video laryngoscope that includes a video camera and a liquid spraying system that a user may utilize to clean the camera lens. The laryngoscope may be used in either video mode or non-video mode, and it may or may not be disposable.

BACKGROUND

There are numerous scenarios in which a patient must be ventilated in order to provide oxygenation. The delivery of oxygen to the patient may be accomplished through the use of an endotracheal tube, which is inserted into the throat of the patient in a procedure known as endotracheal intubation. A laryngoscope is typically used to clear the throat passageway sufficiently to allow proper insertion of the endotracheal tube. Typically, this is done by placing a blade of the laryngoscope against the tongue at the rear of the mouth and compressing the tongue and throat tissue sufficiently to create an open passageway. When performing this procedure the operator often moves at an accelerated pace under pressure because the patient, who may be sedated and chemically paralyzed, is unable to breathe unassisted.

One type of laryngoscopy is video laryngoscopy, wherein the laryngoscope includes a video camera that enables the operator to view the patient's throat and airway on an external screen.

Some video laryngoscopes include a hyper-angulated blade that requires the use of specialized stylets that are placed into the endotracheal tube. This design requires additional training and familiarity with video-based systems, wherein the video-based systems may be different in different medical institutions. This design also requires the procurement of specialized stylets. In addition, if the video camera fails some known video laryngoscope systems cannot be used because they operate solely in video mode because a hyper-angulated blade prevents the operator from seeing past it. This poses disadvantages to the operator and the patient because valuable time may be lost while repairing the video laryngoscope or obtaining another laryngoscope. Further, additional costs may be incurred by the entity (typically a hospital or clinic) required to purchase specialized stylets.

Another disadvantage of many video laryngoscopes is that they are reused rather than disposed after one use. Reusable video laryngoscopes are cleaned after and sterilized to a certain degree, but if the video laryngoscope is not sufficiently cleaned, subsequent patients may be infected.

Another disadvantage of known video laryngoscopes is that the camera lens, and hence the operator's view, may be obscured by bodily fluids or by fogging during the procedure. In that case, the operator must remove the video laryngoscope from the patient's oropharynx, clean the lens, re-oxygenate the patient (such as by using a bag valve mask), and then attempt to locate the appropriate anatomy again using the cleaned video laryngoscope.

SUMMARY

In some embodiments, a laryngoscope, which may be disposable, includes a handle having an inner cavity configured to accept at least part of a syringe. If the laryngoscope is disposable, preferably certain electronics are positioned in a camera cable rather than in the laryngoscope, which reduces the cost of the laryngoscope.

A laryngoscope according to aspects of this disclosure may include (a) a handle having (i) a an inner cavity and a syringe seat disposed at a bottom of the inner cavity, and (ii) a valve disposed below the inner cavity, and (b) a blade connected to the handle, wherein the blade includes (i) a camera having a lens, and (ii) a liquid spraying system configured to spray liquid to clean the lens.

DETAILED DESCRIPTION

As used herein, the term "proximal," when used in connection with a component of a laryngoscope, refers to the end of the component closest to the operator when holding the device, whereas the term "distal," when used in connection with a component of a laryngoscope, refers to the end of the component closest to the patient during use.

The terms "trailing" and "leading" as used herein are to be taken as relative to the operator's (e.g., physician) fingers of the laryngoscope. "Trailing" means relatively close to the operator's fingers, and "leading" means relatively farther away from the operator's fingers.

Figure 1A:
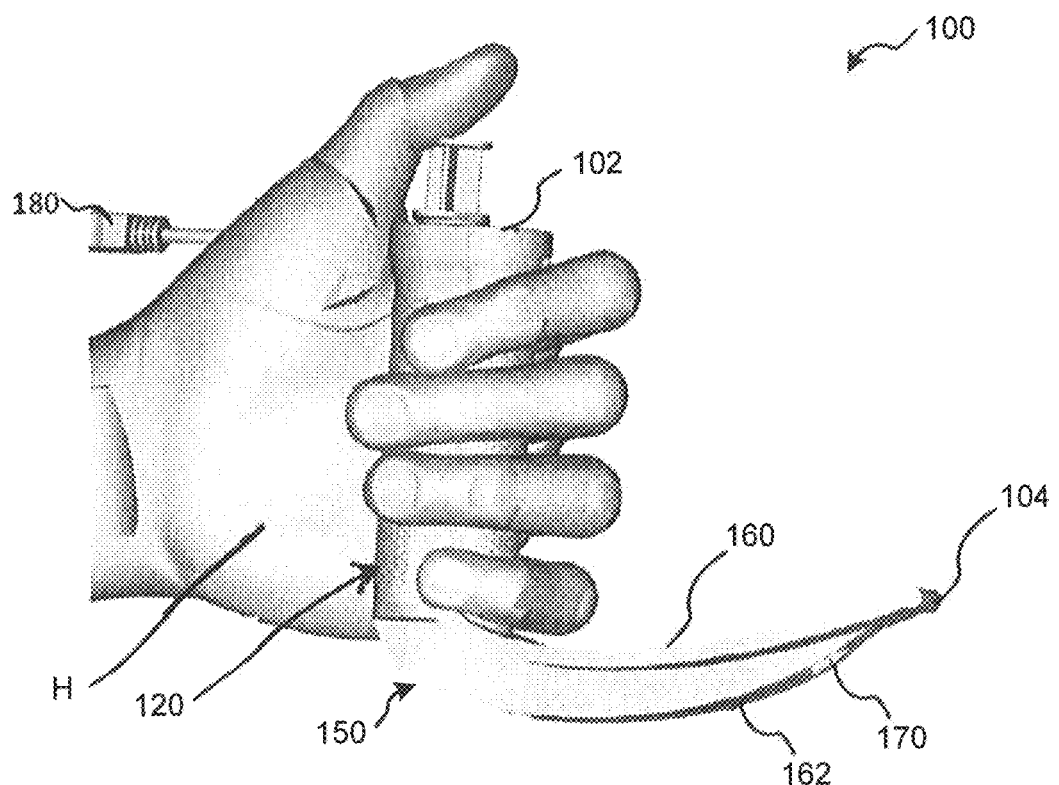
FIG. 1A is a front, perspective view of a laryngoscope, wherein the laryngoscope is being held by an operator.
Figure 1B:
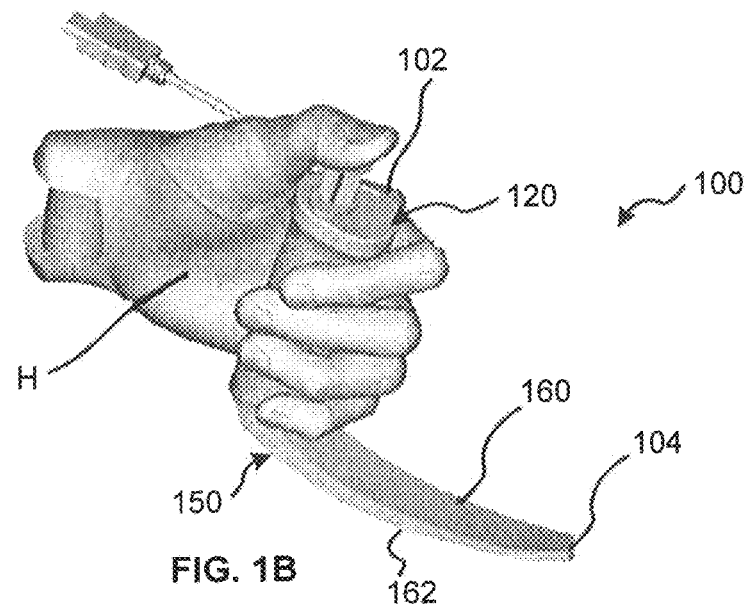
FIG. 1B is a side, perspective view of the laryngoscope of FIG. 1A being held by an operator.
Figure 1C:
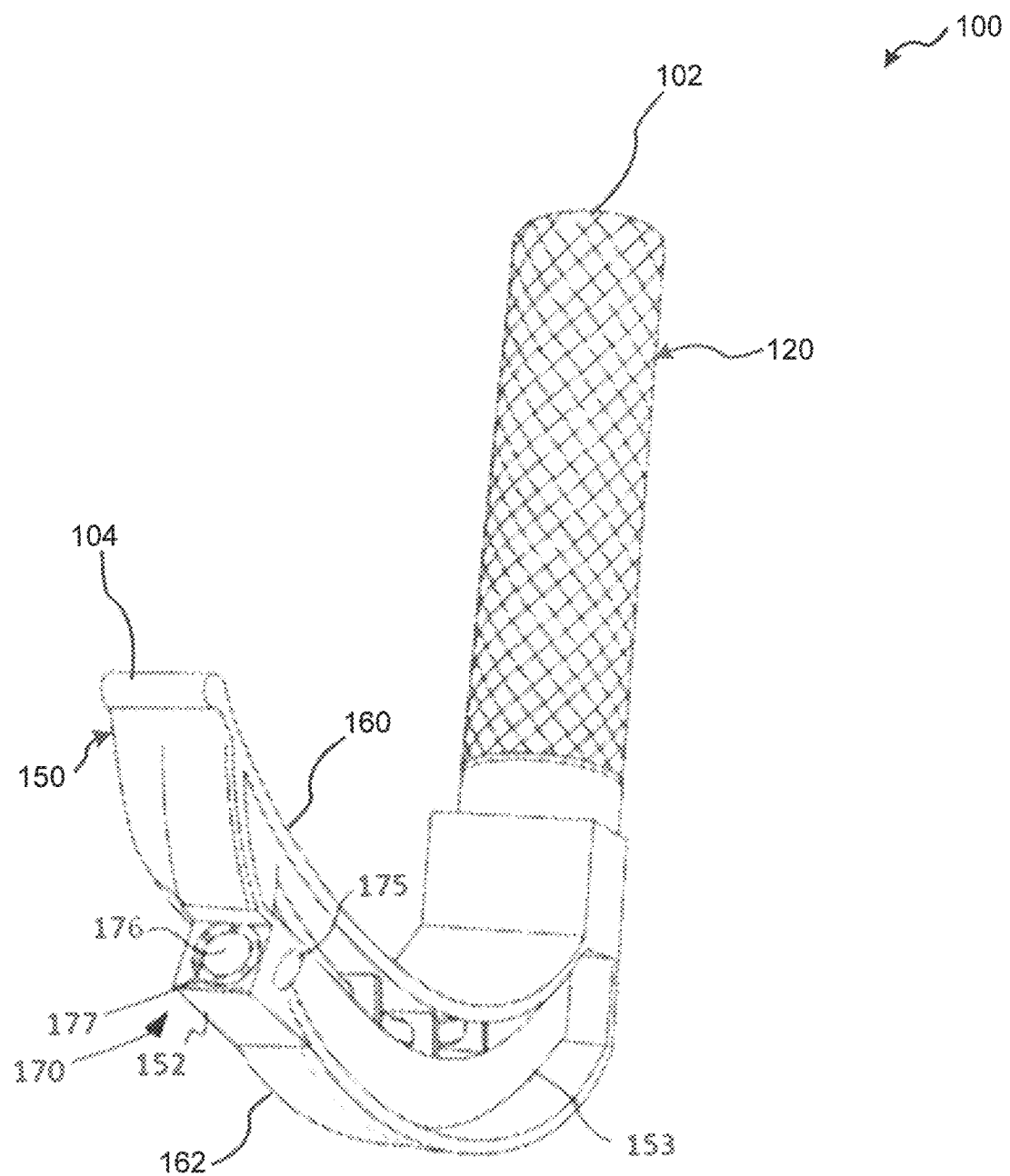
FIG. 1C is a schematic front, perspective view of the laryngoscope of FIG. 1.

Referring now to the Figures, wherein the purpose is to describe embodiments of this disclosure and not to limit the scope of the claims, FIGS. 1A-1C show a laryngoscope 100

(in FIGS. 1A-1B laryngoscope 100 is shown in the hand H of an operator). Laryngoscope 100 generally extends between a proximal end 102 and a distal end 104 and includes a handle 120 and a blade 150 that are in a fixed position relative to one another. In at least some examples, the blade 150 and the handle 120 may be removably coupled to one another. For example, a single handle 120 may be removably coupled to different blades of different sizes so that an operator may choose the blade most suitable for the patient and couple it to the handle. The blades may come in a variety of shapes and/or sizes, and may include one or more sizes for adults and/or children. For adults, for example, a blade 150 may be between 2 and 3 cm in width, while pediatric blades may be between 1 and 2 cm in width. Additionally, in the Figures the laryngoscope 100 is shown with an upward curving blade such as a Macintosh-style blade known in the art, but could instead be a straight blade such as a Miller design, which is also known in the art. The blade 150 and the handle 120 may be comprised of one or more plastics that are intended for disposal after a single use, but a laryngoscope according to this disclosure may instead be configured to be cleaned and reused, in which case the handle 120 and blade 150 could be comprised of metal(s) or plastics(s) suitable for cleaning.

Handle 120 may include a body 121 having a grip 122 on a side closer to blade 150, the grip including a series of concavities 123 configured and arranged to receive fingers of the operator for more a comfortable grasp. Blade 150 includes a top 160 and a bottom 162.

Figure 10:
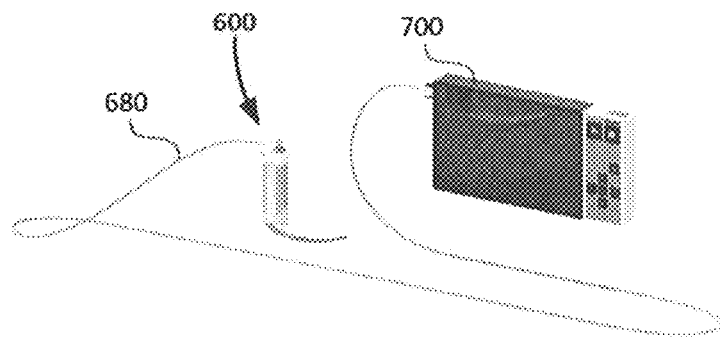
FIG. 10 is a side, perspective view of the laryngoscope of FIG. 6 connected to a video projector.

As shown in FIGS. 1A and 1C, laryngoscope 100 may include an endoscopic video camera or imaging device 170 that is connected to a camera cable 180 (e.g., HDMI cable, USB-c, etc.) that is connectable to an external display, such as display 700 in FIG. 10. As will be described below, laryngoscope 100 may also include structures for cleaning the lens of camera 175 while the laryngoscope 100 is being used.

One example of imaging device 170 is shown in FIG. 1C. Imaging device 170 as shown is positioned near the distal end of blade 150 and situated within a housing 152 located within a walled-off recess 153 inside the blade 150. Imaging device 170 may include an endoscopic camera 175 situated within the housing 152 and having a lens 176. In some examples, lens 176 is surrounded by one or more light sources 177 that as shown are LEDs. One or more light source(s) 177 may serve the dual purpose of (1) heating the lens 176 to reduce condensation, and (2) illuminating tissue directly proximate to the blade 150. The camera 175 may be connected directly to camera cable 181 (shown in FIG. 2A), wherein camera cable 181 carries a video signal from camera 175 to an external monitor, such as monitor 700 in FIG. 10, so that an operator can view video from camera 175.

A difficulty that an operator may face when attempting to obtain good views during the intubation procedure is that the lens of endoscopic camera 175 may become fogged or unclean because of blood, vomit, or other bodily fluids. In that case, the operator cannot see and it is difficult to intubate the patient. To help prevent fog on lens 176 and/or to provide illumination for camera 175, one or more light sources (such as LEDs) 177 may be built within the camera housing 152, or otherwise be sufficiently close to lens 176, so as to provide heat and/or illumination.

In the embodiments shown, one or more light sources (such as LEDs) 177 are a source of illumination for the camera 175 and, for purposes of defogging the lens 176, may be located sufficiently adjacent the camera lens 176 to provide enough heat to keep fog off the lens 176. In this example, the camera 175 is located within the bottom 162 of the blade 150. Camera 175 preferably stays in the proper position by a guide that is bossed onto the camera 175 or the structure of housing 152, each of which is known in the art. The camera 175 may be retained within housing 152 on the bottom 162 of blade 150. The cable 181 may extend from camera 175 through the blade 150 and upwardly through the inside of the back of handle 120.

Figures 2A, 2B:
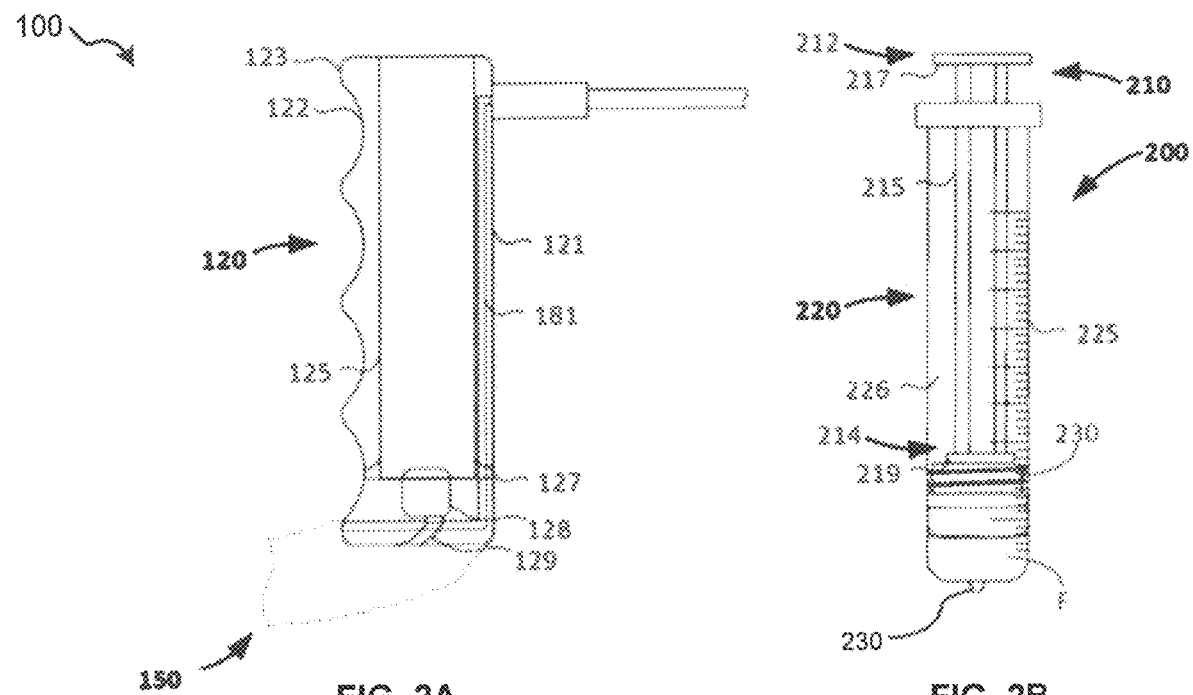
FIG. 2A is a side, cross-sectional view of the laryngoscope of FIG. 1A.
FIG. 2B is a side view of a syringe that may be used with a laryngoscope according to this disclosure.
Figure 2C:
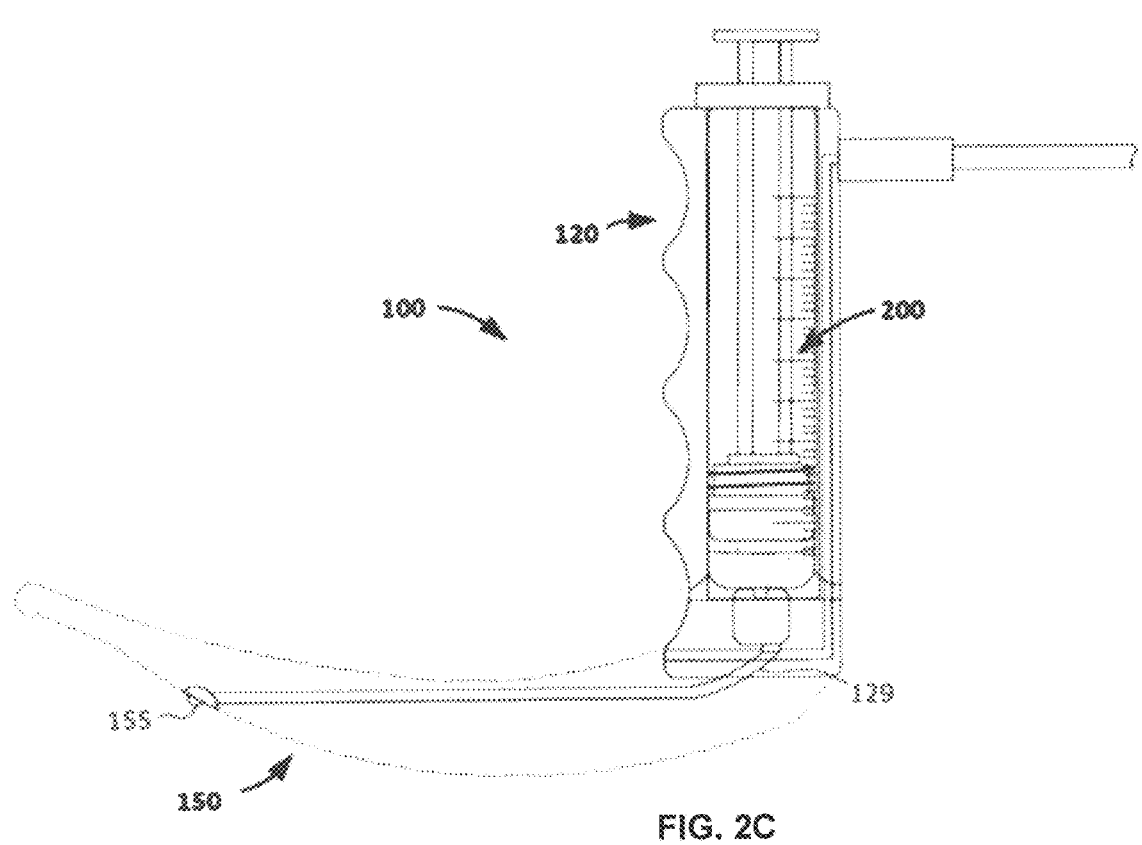
FIG. 2C is a side, cross-sectional view of the laryngoscope of FIG. 1A with the syringe of FIG. 2B positioned therein.
Figure 2D:
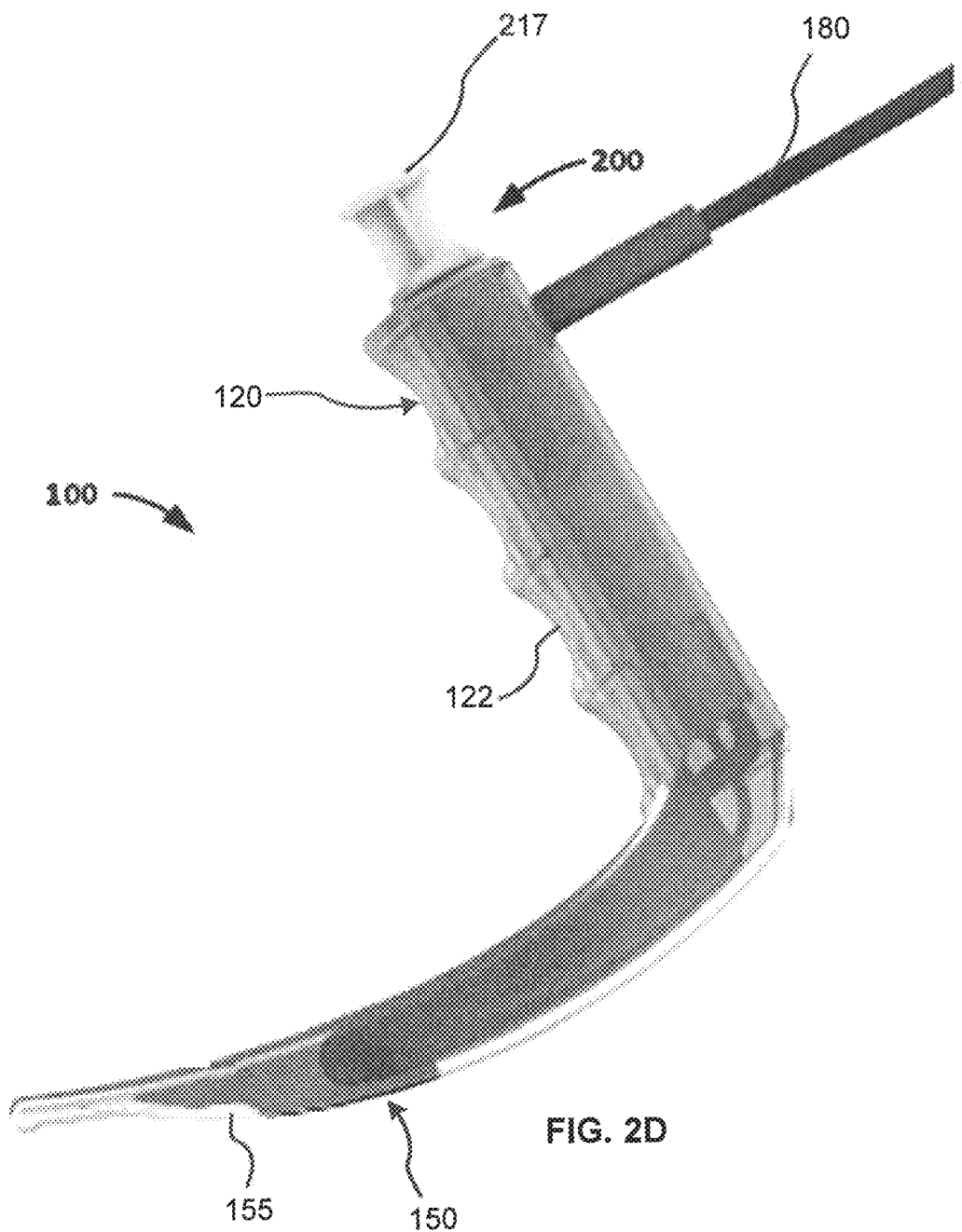
FIG. 2D is a side view rendering showing a syringe disposed within a cavity of the handle of a laryngoscope according to this disclosure.

Turning to FIGS. 2A-2D, the liquid spraying system of laryngoscope 100 will be described in greater detail. As shown, body 121 of handle 120 may define a inner cavity 125, which as shown is generally cylindrical and is configured to receive a syringe 200, wherein syringe 200 is shown in FIGS. 2B-2D.

Syringe 200 may generally comprise two main portions, a plunger rod 210 and a barrel 220. These components are comprised of polypropylene or of any suitable material. Plunger rod 210 generally extends between a proximal end 212 and a distal end 214, and comprises an elongated piston 215 extending between a thumb press 217 and a coupler 219. In one embodiment, piston 215 has a cruciform cross-sectional shape.

A cylindrical barrel 220 extends between proximal end 212 and distal end 214 and comprises a body 225 defining a lumen 226 for accepting a portion of plunger rod 210. The barrel 200 may have a flared end with an enlarged outer diameter than the rest of the barrel.

Body 225 includes a reservoir "F" that holds a fluid (e.g., water, saline, etc.). An internally threaded stopper 230 is disposed inside lumen 126 of body 125. In one embodiment, stopper 130 may be made of an elastomeric material such as natural rubber, synthetic rubber, thermoplastic elastomers, or combinations thereof. Stopper 230 includes an opening to receive and mate with coupler 219 of plunger rod 210 by advancing the plunger rod inside the barrel lumen 226 and rotating at least one of coupler 219 and stopper 230 relative to the other. Syringe 200 may terminate in a slip tip 230, which is known in the art, or a luer-lock tip, for mating with components of the laryngoscope 100.

In at least some examples, syringe 200 is a 3 mL to 10 mL syringe, wherein the volume is selected depending on the intended use. Syringe 200 may be between 7 and 15 cm in length or be of any suitable length. Turning again to FIG. 2A, cylindrical cavity 125 may be sized to accept a substantial majority (e.g., up to 50%, up to 75%, or up to 80% of the length of syringe 200). Syringe 200 may be received within seat 127, which is configured to stabilize and retain the syringe. In some examples, seat 127 further includes a coupling mechanism (e.g., a luer lock) for coupling or mating with the syringe 200. Cylindrical cavity 125 may be configured, and seat 127 may be positioned so that thumb press 217 of syringe 200 is at a distance from the top of the handle 120 that is less than 3 inches. Additionally, cavity 125 is wide enough to accept barrel 220 of syringe 200, but is preferably not large enough for the flared end of the barrel or the thumb press 217 to extend therethrough. With thumb press 217 disposed above the handle, and with the syringe 200 seated within the cavity as shown, the operator may use his/her thumb to press on the syringe while holding the handle to eject a fluid from the syringe 200 out through the nozzle 155.

A valve 128 may be disposed adjacent seat 127, the valve being configured and arranged to regulate the flow of fluid and/or prevent leakage from the syringe to tubing 129. In at least some examples, valve 128 is configured to pressurize the fluid that flows through tubing 129 and eventually nozzle 155 in blade 150.

The liquid spraying system including seat 127, valve 128, tubing 129 and nozzle 150 may be fluid-tight from syringe 200 to the nozzle 155. When operational, fluid travels through tubing 129 through the handle 120 and blade 150 of the laryngoscope 100 to the nozzle 155 from which it is sprayed onto the lens 176. The fluid may exit the nozzle 155 in any suitable manner to clean lens 176, such as a jet and preferably strike the center of the lens 176 in order to clear fog and/or obstructions. In the embodiment shown, tubing 129 runs from the valve 128 to nozzle 155 to deliver a liquid spray to the lens 176.

Figure 3A:
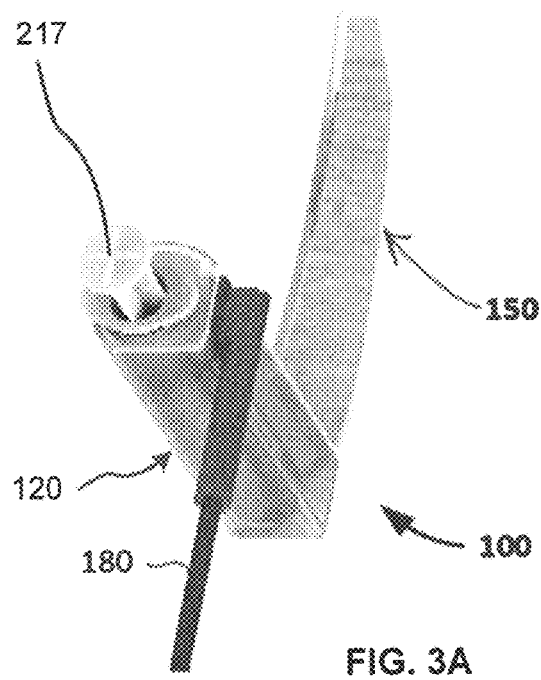
FIG. 3A is a top, perspective view of the laryngoscope of FIG. 2D.
Figure 3B:
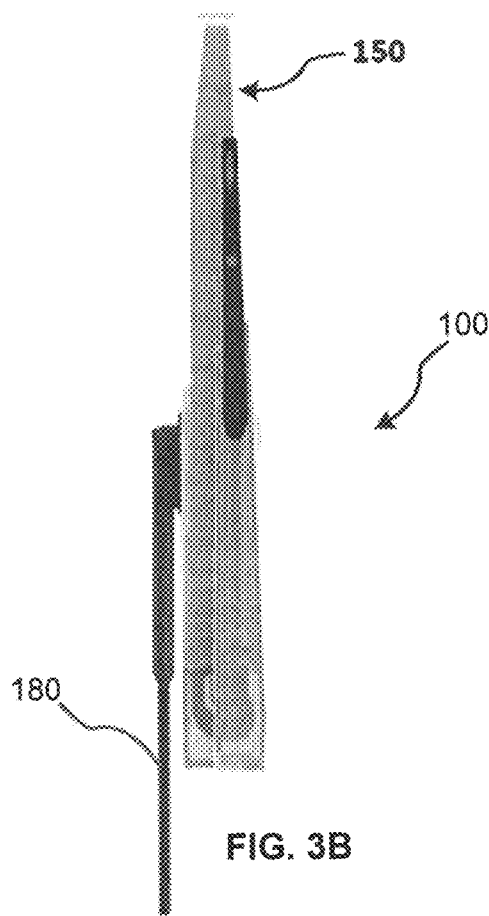
FIG. 3B is a bottom view of the laryngoscope of FIG. 3A.

FIGS. 3A-B better illustrate the top and bottom of blade 150 and show the connection of camera cable 180 to the side of handle 120. Laryngoscope 100 may be physically untethered from external devices such as a monitor or an external source of cleansing liquid. Such alternative embodiments may be desirable in non-hospital environments when emergency situations call for immediate intubation under field conditions. For example, video signals may be sent to an external monitor using a Bluetooth or comparable wireless medium utilizing a small transmission circuit. Power may be furnished to the LEDs and imaging device through a small, replaceable or rechargeable battery situated in the handle 120, the blade 150 or in any suitable location.

Figure 4A:
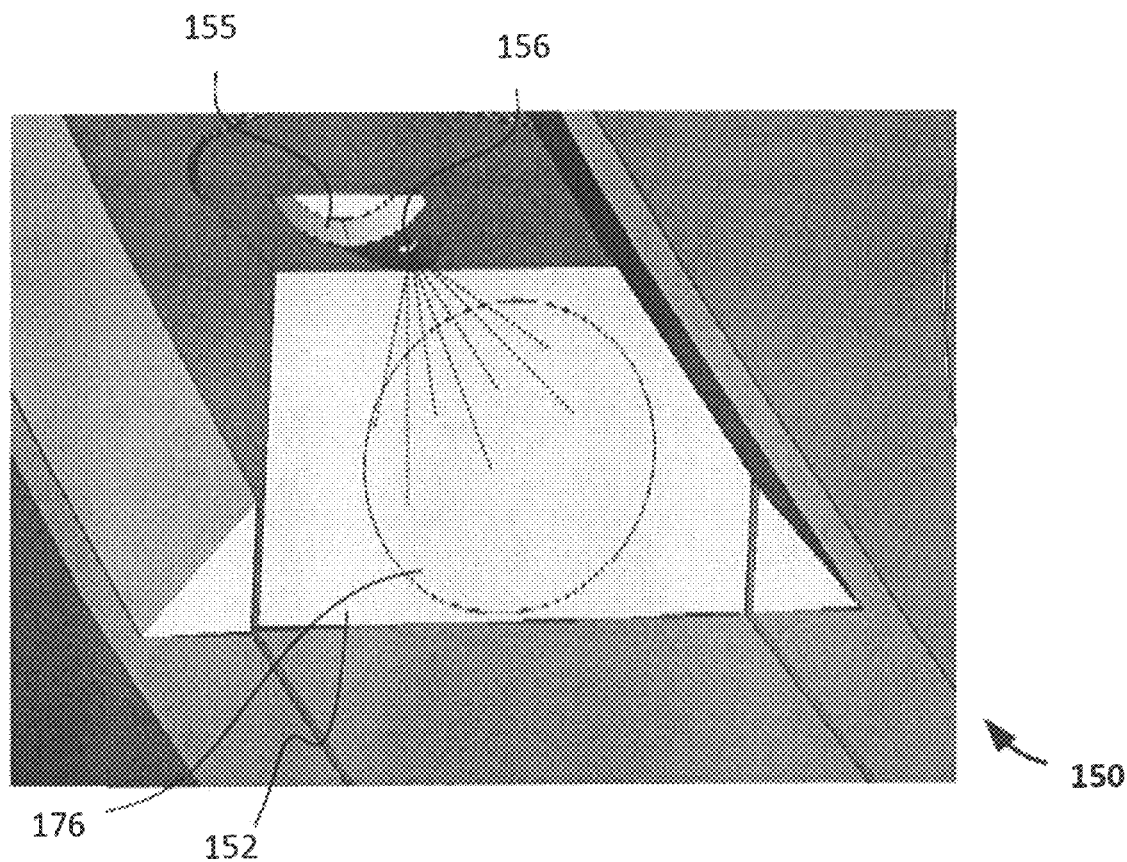
FIG. 4A is a schematic, partial view of a portion of a laryngoscope according to this disclosure and showing the orientation of the nozzle with respect to the lens.

In the partial view of FIG. 4A, the orientation and positioning of nozzle 155 is shown with respect to lens 176. As previously noted, lens 176 may be disposed flush with housing 152. Alternatively, lens 176 is recessed within housing 151 or slightly extend from the housing 151. In the example of FIG. 4A, nozzle 155 extends from a bottom of blade 150, but above lens 176 and is substantially conical or cylindrical.

Nozzle 155 and lens 176 may be disposed in any suitable manner relative one another, such as perpendicular with one another, wherein the nozzle 155 is disposed above the lens 176 and closer to the distal end of laryngoscope 100. An aperture 156 is formed in nozzle 155 and in this example is angled so that fluid is sprayed from the nozzle 155 onto the lens 176.

Figure 4B:
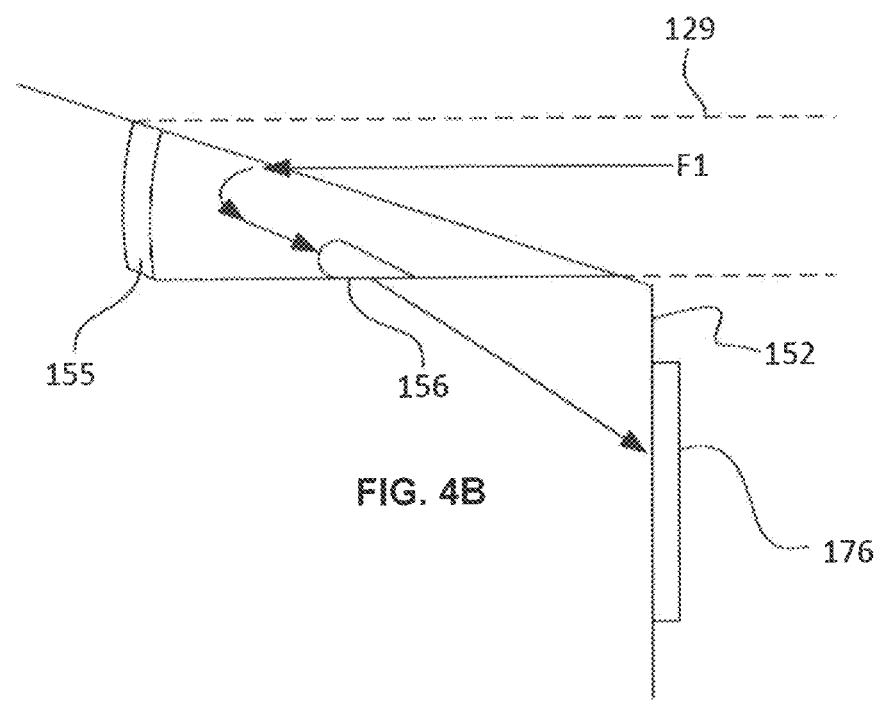
FIG. 4B is a partial side view of a nozzle and surrounding structure according to this disclosure.

Turning to FIG. 4B, nozzle 155 as shown is generally coaxial with tubing 129 and in fluid communication therewith. Fluid F flowing through tubing 129 is pushed in the direction F1 past lens 176, where it flows and is pushed against nozzle 155 and moves through aperture 156 onto lens 176, as shown, for example, in FIGS. 4A and 4B. In some examples, nozzle 155 is longitudinally off-center or unaligned with lens 176. Alternatively, nozzle 155 may be longitudinally centered or aligned with lens 176.

Figure 5:
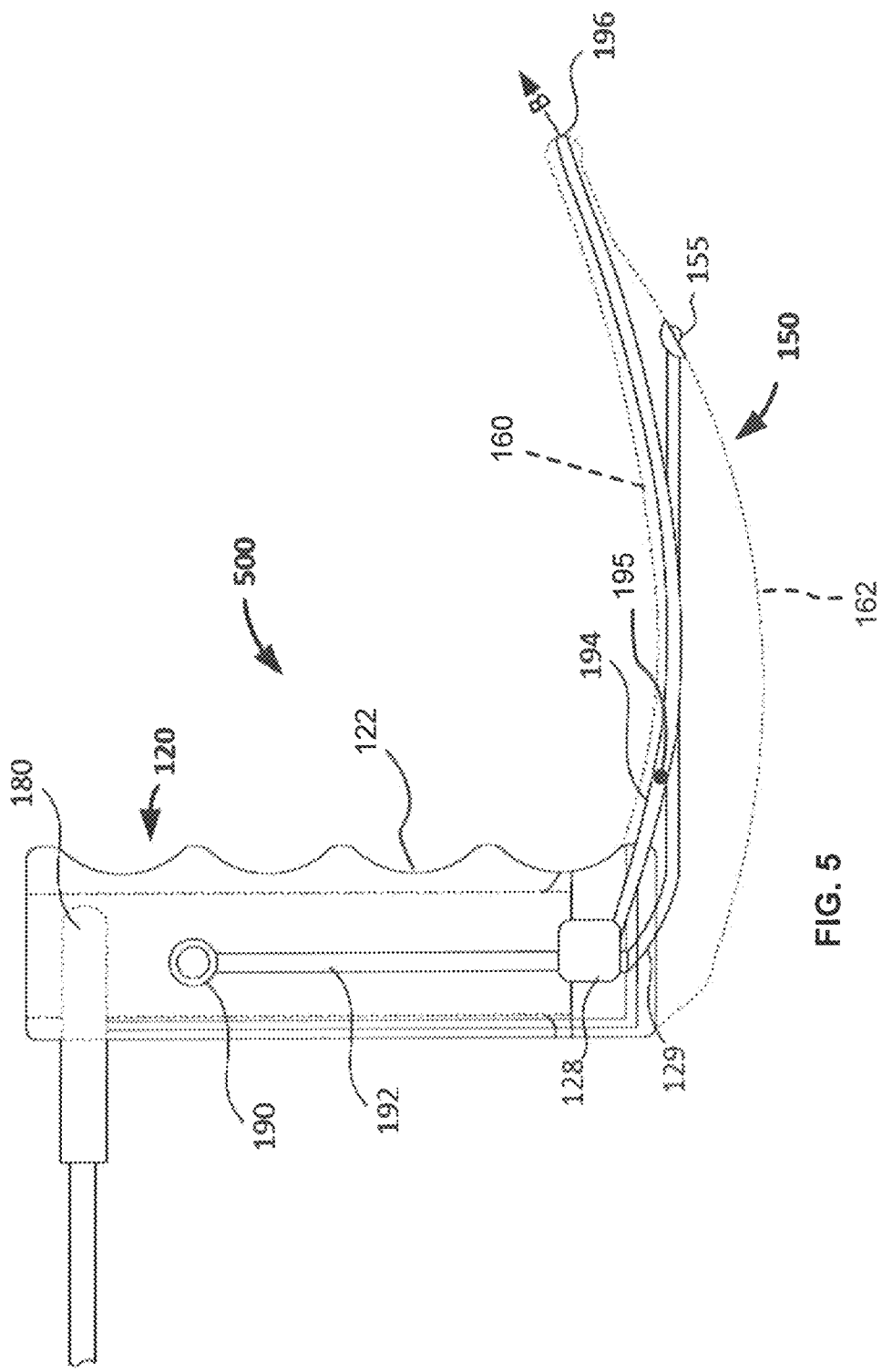
FIG. 5 is a side, partial cross-sectional view of a laryngoscope according to another embodiment of the disclosure.
Figure 6:
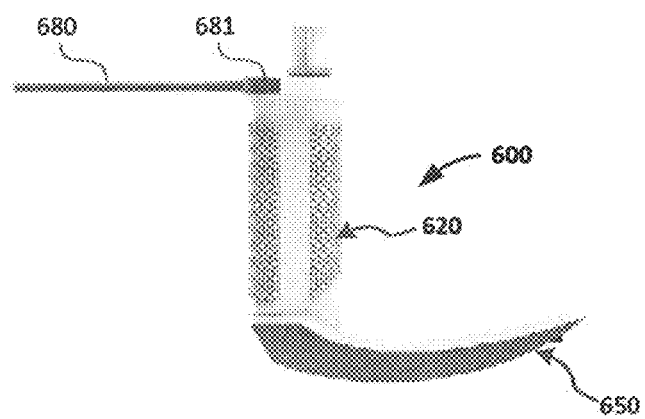
FIG. 6 is a side view of a laryngoscope according to another embodiment of the disclosure.

Turning now to FIG. 5, an alternate embodiment of a laryngoscope according to this disclosure is shown that includes an additional cleaning system. Laryngoscope 500 is similar to laryngoscope 100 and includes all or any combination of the same components. In addition to the components of laryngoscope 100, laryngoscope 500 includes a secondary port 190 configured to receive additional fluid from an IV, syringe or bag, and laryngoscope 500 delivers the fluid through tubing 192 to a valve 128. Port 190 may be disposed on one side of the handle 120 and cable 180 may be disposed on a second, opposing side of the handle 120. In at least some examples, the valve may be or include an integrated valve 128 capable of regulating fluids and help prevent leaks from both syringe 200 and port 190. Alternatively, two separate valves may be used. For example, a second valve 195 may be in secondary line 194. Fluid may flow from the valve 128 through secondary line 194 where it exits through secondary nozzle 196 disposed at the distal end of blade 150. Nozzle 196 has an aperture similar to that described above regarding nozzle 155 to spray the fluid in the direction of arrow "B". In some examples, this secondary fluid system may be used to clear debris from inside the oropharynx.

Figure 11:
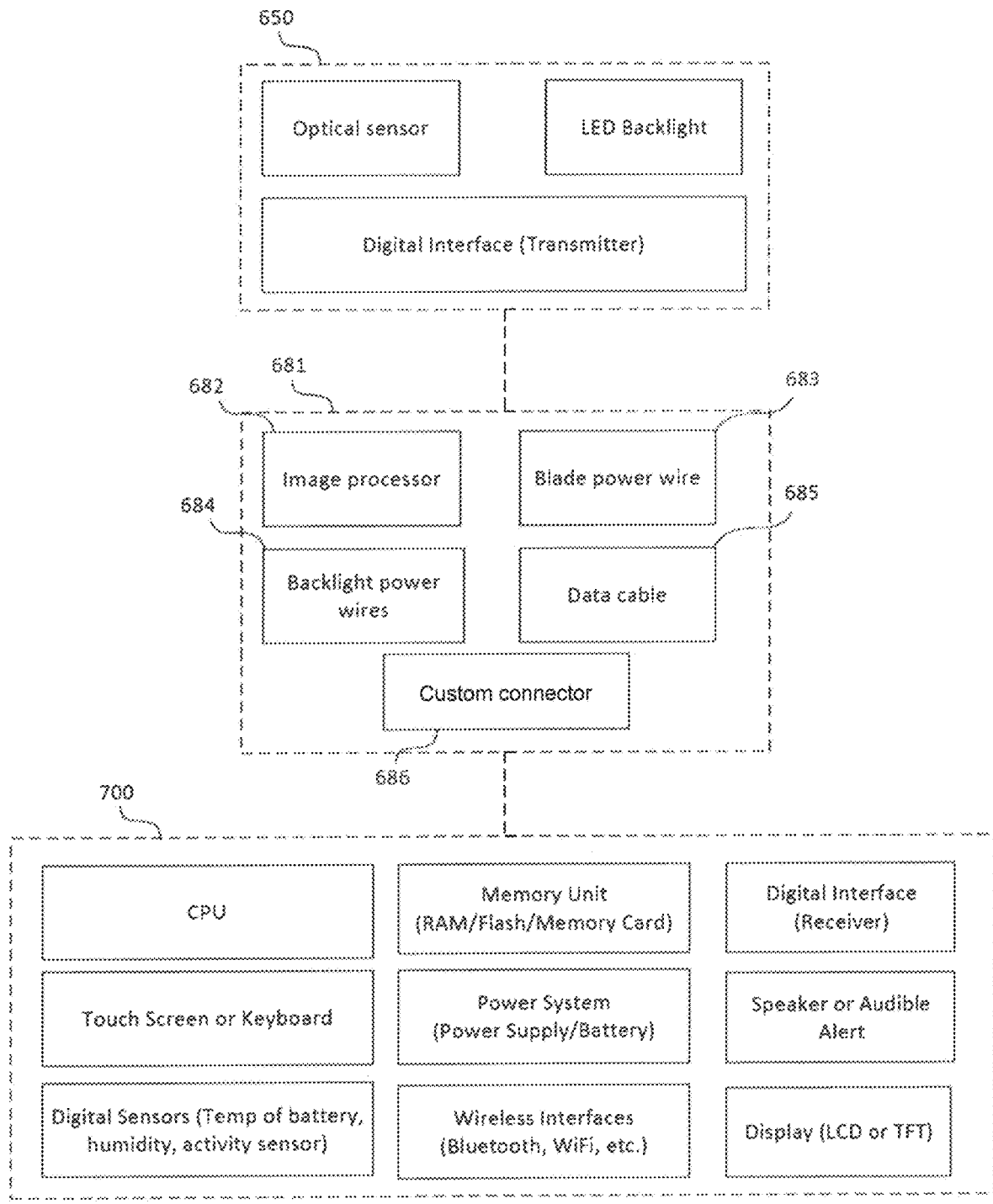
FIG. 11 is a block diagram illustrating certain components of a system for laryngoscopy.

In another embodiment, shown in FIGS. 6-10, laryngoscope 600 is similar to laryngoscope 100 and includes all or any combination of the same components such as a handle 620 and a blade 650. This embodiment may or may not, however, include a spray system to clean the lens or a secondary spray system. In this example, cable 680 is in electronic communication with laryngoscope 600 via cable hub 681, which may include a connector 686, such as an HDMI connector, USB-c, or other similar or proprietary communications devices and protocols. Hub 681 may also include an image processor 682, a blade power wire 683, a backlight power wire 684, and/or a data cable 685 as illustrated in FIG. 11, and certain of these components may extend through cable 680. With such a configuration, certain components (such as image processor 682) are outside of the laryngoscope in order to decrease the cost of the laryngoscope, but the components are still within a sufficient physical proximity to the camera 175 to enable the device and system to function properly. Thus, in this embodiment hub 681 may be reusable while the laryngoscope 600 may be disposable, but any laryngoscope according to this disclosure could be disposable.

Figure 7:
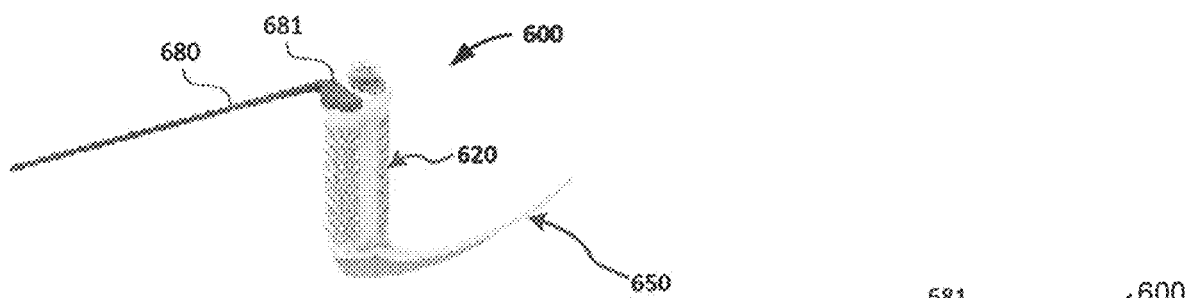
FIG. 7 is a side, perspective view of the laryngoscope of FIG. 6.
Figure 8:
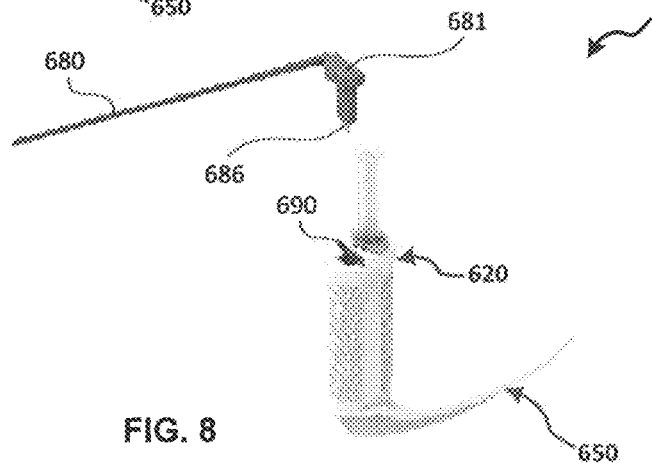
FIG. 8 is a side, perspective view of the laryngoscope of FIG. 6 with the camera cable removed.

In one example, best shown in FIGS. 7-8, cable hub 681 is fully or partially insertable into an axially-extending slot 690 in the handle 620, or in the inner cavity that accepts the syringe. The longitudinal axis of cable hub 681 may be substantially parallel with the longitudinal axis of handle 620 when the two are coupled, and a flush or level surface may be formed of the top of cable hub 681 and the top of handle 620 when the connector is properly inserted. Any suitable configuration to couple cable hub 681 with handle 620 may be utilized.

Figure 9:
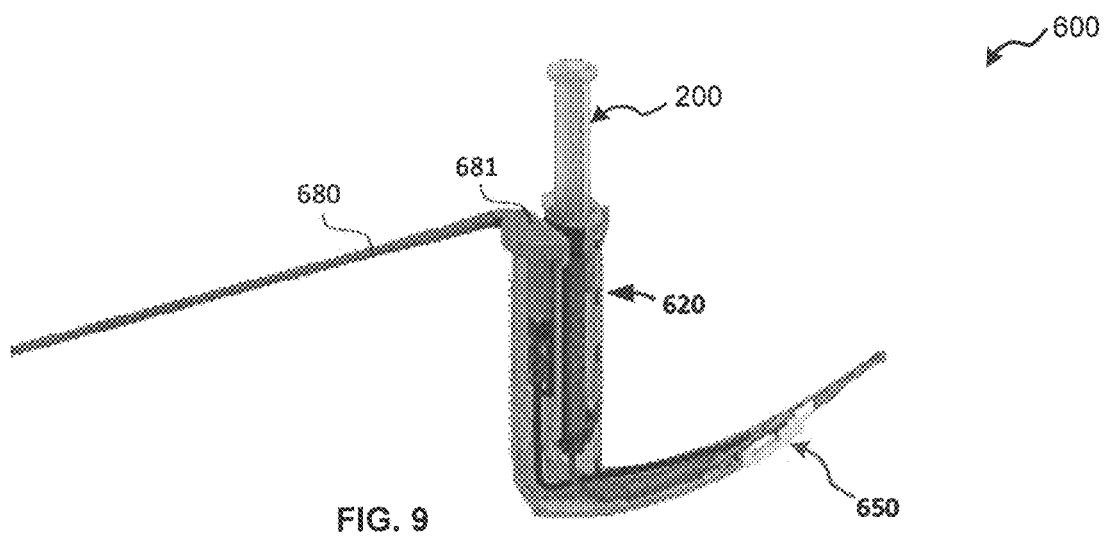
FIG. 9 is a side, partial cross-sectional view of the laryngoscope of FIG. 6.

FIG. 9 is a cutaway view that shows how the connector is disposed within slot 690 of the handle.

FIG. 10 illustrates laryngoscope 600 being connected to a video module 700 via cable 680, wherein video module 700 is used to display, and optionally manage (e.g., save, archive, send, compare, etc.) the images acquired by the camera of the laryngoscope 100 or 600. As previously described, a wireless connection between laryngoscope 600 and module 700 is also possible. A schematic showing certain components of the blade 650, the hub 681 and the module 700 is shown in FIG. 11.

A laryngoscope as disclosed herein may be incorporated into other devices such as bronchoscopes, fiber optic intubation devices, and others. The purpose of secondary cleaning system would be to help the clinician clean the target area for visual identification of the area.

In one embodiment, the laryngoscope is built as a single unit that does not require the assembly of components and is designed for single-use only. The preassembly of the laryngoscope allows for reduced time needed for preparation for this procedure and eliminates the risk of missing components. The disposable nature of the device reduces the burden on facility resources and removes the risk of unintended spread of disease among subsequent patient encounters with the device. Further, the blade and handle may be separate units that are combined for use such that a single handle containing a liquid reservoir, or an electronic module and battery may be used with any number of disposable blade.

Some non-limiting examples of this disclosure follow:

Example 1: A laryngoscope comprising:
  a handle comprising (a) an inner cavity configured to accept at least part of a syringe, (b) a syringe seat disposed at a bottom of the inner cavity, and (c) a valve disposed below the inner cavity; and
  a blade coupled to the handle, the blade comprising a housing including a camera having a lens.

Example 2: The laryngoscope of example 1, wherein the inner cavity is configured to accept a 10 mL syringe.

Example 3: The laryngoscope of any one of examples 1-2, wherein the inner cavity has a cavity length that is greater than fifty percent of a length of the syringe.

Example 4: The laryngoscope of any one of examples 1-3, wherein the inner cavity has a cavity length that is greater than seventy-five percent of a length of the syringe.

Example 5: The laryngoscope of any one of examples 1-4, wherein at least one of the syringe seat and the valve includes a luer coupling.

Example 6: The laryngoscope of any one of examples 1-5, further comprising a tubing coupled to and in communication with the valve, the tubing extending through a portion of the blade.

Example 7: The laryngoscope of example 6, wherein the tubing extends to a position juxtaposed the lens.

Example 8: The laryngoscope of example 7, wherein the tubing extends to a position distal to the lens.

Example 9: The laryngoscope of any one of examples 6-8, further comprising a nozzle juxtaposed the lens, the nozzle having an aperture and being configured to spray liquid onto the lens.

Example 10: The laryngoscope of example 9, wherein the nozzle includes a fluid-tight terminal end at a distal end.

Example 11: The laryngoscope of any one of examples 9-10, wherein the lens and the nozzle are on a bottom of the blade.

Example 12: The laryngoscope of any one of examples 9-11, wherein the nozzle is configured to spray fluid onto a center of the lens.

Example 13: The laryngoscope of any one of examples 1-12, that further comprises a secondary spraying system configured to spray fluid on either the lens or an oropharynx of a patient.

Example 14: The laryngoscope of example 13, wherein the secondary spraying system comprises a secondary port disposed on the handle.

Example 15: The laryngoscope of example 14, wherein the secondary port is disposed on a side of the handle.

Example 16: The laryngoscope of any one of examples 13-15, further comprising a secondary line extending through the blade and terminating at a secondary nozzle.

Example 17: The laryngoscope of example 16, wherein the secondary nozzle is disposed distal to the nozzle.

Example 18: The laryngoscope of any one of examples 16-17, wherein the secondary nozzle is configured to spray a fluid through a distal most end of the blade.

Example 19: The laryngoscope of any one of examples 16-18, further comprising a secondary valve coupled to the secondary line.

Example 20: The laryngoscope of any one of examples 1-19, wherein the handle further includes a slot, and further comprising a cable hub configured to be at least partially receivable within the slot.

Example 21: The laryngoscope of example 20, further comprising an imaging processor positioned in the cable hub.

Example 22: The laryngoscope of example 20, wherein the cable hub includes a connector.

Example 23: The laryngoscope of example 22, wherein the connector is one of an HDMI connector and a USB-c connector.

Example 24: The laryngoscope of example 20 that further includes a blade power wire in the cable hub.

Example 25: The laryngoscope of example 20 that further includes a backlight power wire in the cable hub.

Example 26: The laryngoscope of example 20 that further includes a data cable in the cable hub.

Example 27: The laryngoscope of any one of examples 1-26 that further comprises a camera cable having a first end and a second end, wherein the first end is connected to the camera.

Example 28: The laryngoscope of example 27, wherein the second end of the camera cable is connected to a video display.

Example 29: The laryngoscope of any one of examples 1-28 that further comprises a light source juxtaposed the lens, wherein the light source is configured to heat the lens and/or provide illumination for the camera.

Example 30: The laryngoscope of example 29, wherein the light source is one or more LEDs.

Example 31: The laryngoscope of any one of examples 29-30, wherein the light source is positioned in the housing.

Example 32: A system comprising:
  the laryngoscope of any one of examples 1-31; and
  a syringe positioned in the inner cavity, wherein the syringe includes a barrel, and a plunger.

The embodiments described herein are merely illustrative of the principles and applications of the present disclosure. For example, the number, positioning and arrangement of certain components may be varied. Moreover, certain components are optional, and this disclosure contemplates various configurations and combinations of the structures disclosed herein. Thus, modifications may be made to the illustrative embodiments and other arrangements may be devised without departing from the spirit and scope of the present disclosure as defined by the appended claims.

What is claimed is:

1. A laryngoscope comprising:
  a syringe having a first longitudinal axis;
  a handle having a proximal end, a distal end, and a second longitudinal axis coaxially aligned with the first longitudinal axis, the handle comprising (a) an inner cavity configured to accept at least fifty percent of a length of the syringe, the inner cavity having a first open end and a closed second end, (b) a syringe seat disposed and affixed at a bottom of the inner cavity closer to the closed second end than the first open end, (c) a valve disposed below the inner cavity adjacent the syringe seat, (d) an electronic communication slot defined in the handle adjacent the proximal end;
  a cable hub having a connector for electronically and removably coupling to the electronic communication slot, the cable hub having an image processor;
  a blade coupled to the distal end of the handle and unitarily formed therewith, the blade comprising a housing including a camera and a lens;

a data cable extending from the communication slot to the camera;

a tubing coupled to and in communication with the valve, the tubing extending through a portion of the blade; and a nozzle connected to the tubing, wherein the nozzle is juxtaposed the lens, and the nozzle includes an aperture configured to spray fluid onto the lens;

wherein the handle further includes an axial slot disposed parallel with the inner cavity, and further comprising a hub at least partially receivable within the axial slot.

2. The laryngoscope of claim 1, wherein the inner cavity has a cavity length that is greater than fifty percent of the length of the syringe.

3. The laryngoscope of claim 1, wherein the inner cavity has a cavity length that is greater than seventy-five percent of the length of the syringe.

4. The laryngoscope of claim 1, wherein the tubing extends to a position juxtaposed the lens.

5. The laryngoscope of claim 1, wherein the nozzle includes a fluid-tight terminal end.

6. The laryngoscope of claim 1, wherein the camera and the nozzle are on a bottom of the blade.

7. The laryngoscope of claim 1 that further comprises a secondary spraying system.

8. The laryngoscope of claim 7, wherein the secondary spraying system includes a secondary port disposed on the handle.

9. The laryngoscope of claim 8, further comprising a secondary line extending through the blade and terminating at a secondary nozzle, wherein the secondary nozzle is configured to spray fluid onto the lens or into the oropharynx.

10. The laryngoscope of claim 9, wherein the secondary nozzle is disposed distal to the primary nozzle.

11. The laryngoscope of claim 9, wherein the secondary nozzle is configured to spray a fluid through a distalmost end of the blade.

12. The laryngoscope of claim 9, further comprising a secondary valve coupled to the secondary line.

13. The laryngoscope of claim 1, further comprising an imaging processor disposed within the hub.

14. The laryngoscope of claim 1, further comprising a light source juxtaposed to lens, wherein the light source is configured to heat the lens and/or provide illumination for the camera.

15. The laryngoscope of claim 14, wherein the light source is one or more LEDs.

16. The laryngoscope of claim 14, wherein the light source is positioned in the housing.

17. The laryngoscope of claim 1, wherein the cable hub is disposed outside the inner cavity.

18. A laryngoscope comprising:

a syringe having a first longitudinal axis;

a handle having a proximal end, a distal end, and a second longitudinal axis coaxially aligned with the first longitudinal axis, the handle comprising (a) an inner cavity configured to accept at least fifty percent of a length of the syringe, the inner cavity having a first open end and a closed second end, (b) a syringe seat disposed and affixed at a bottom of the inner cavity closer to the closed second end than the first open end, (c) a valve disposed below the inner cavity adjacent the syringe seat, (d) an electronic communication slot defined in the handle adjacent the proximal end;

a cable hub having a connector for electronically and removably coupling to the electronic communication slot, the cable hub having an image processor;

a blade coupled to the distal end of the handle and unitarily formed therewith, the blade comprising a housing including a camera and a lens;

a data cable extending from the communication slot to the camera;

a tubing coupled to and in communication with the valve, the tubing extending through a portion of the blade; and a nozzle connected to the tubing, wherein the nozzle is juxtaposed the lens, and the nozzle includes an aperture configured to spray fluid onto the lens, wherein the electronic communication slot is an axially-extending slot that is parallel with the first longitudinal axis.

* * * * *